G. FRIEL.
BACK FOR MOTOR CYCLE SADDLES.
APPLICATION FILED AUG. 5, 1912.
1,168,253.
Patented Jan. 11, 1916.
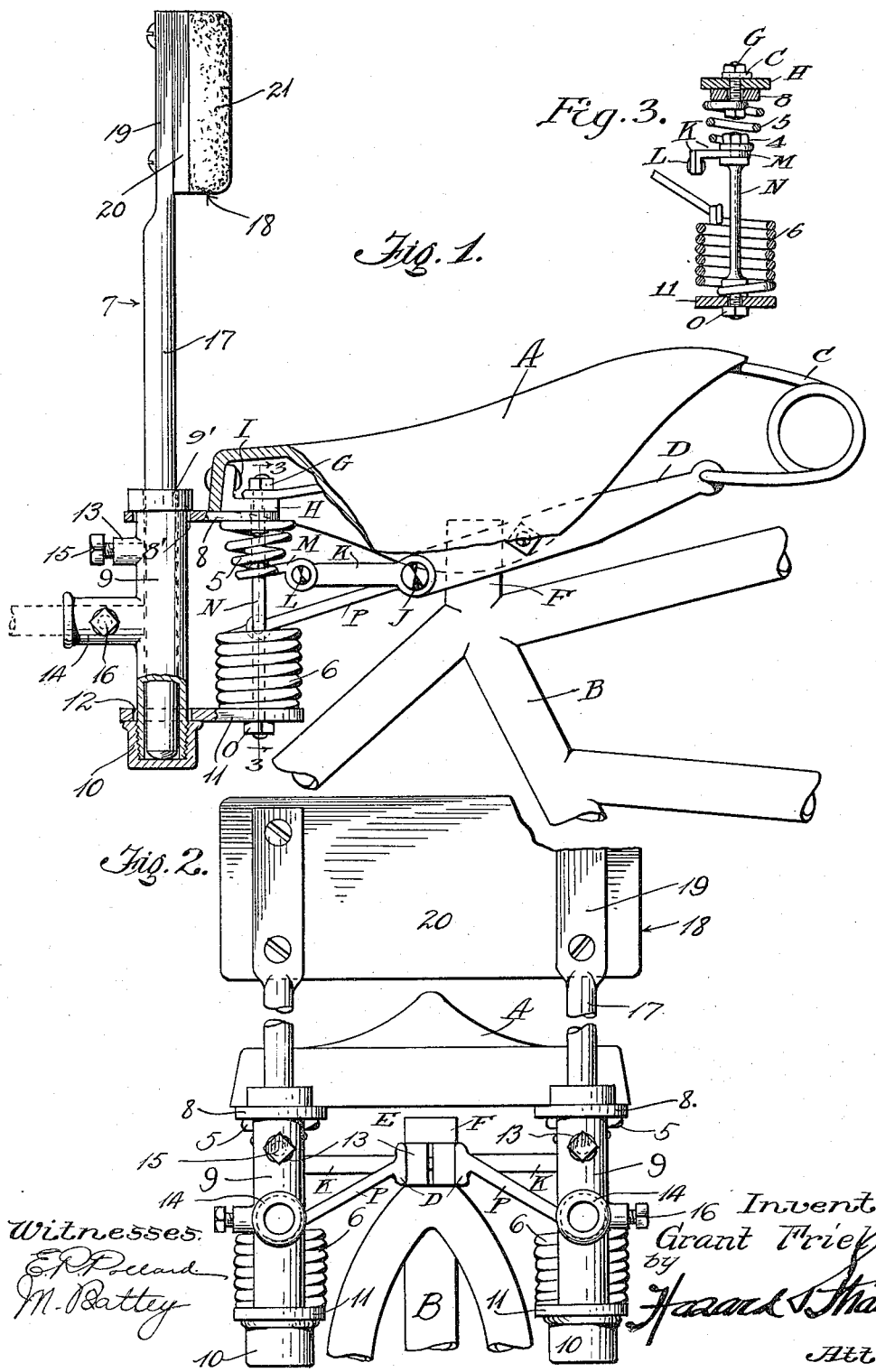

UNITED STATES PATENT OFFICE.

GRANT FRIEL, OF LOS ANGELES, CALIFORNIA.

BACK FOR MOTOR-CYCLE SADDLES.

1,168,253.  Specification of Letters Patent.  Patented Jan. 11, 1916.

Application filed August 5, 1912. Serial No. 713,230.

*To all whom it may concern:*

Be it known that I, GRANT FRIEL, a citizen of the United States, residing at Los Angeles, in the county of Los Angeles and State of California, have invented a new and useful Improvement in Backs for Motor-Cycle Saddles, of which the following is a specification.

This invention relates in particular to an appliance to be applied to motor propelled bicycles, and its principal object is to provide a back for a saddle that can be readily attached to a saddle already in use.

It is also an object to provide a back that is easily removable from the connection to the saddle.

It is a further object to provide means for resiliently supporting a back to the saddle by means of the saddle springs.

In the accompanying drawings, Figure 1 is a side elevation of the saddle and a portion of the bicycle frame showing the improved device as applied to the saddle. Fig. 2 is a rear view of the device showing a portion of the frame and the saddle. Fig. 3 is a detail section on the line 3—3 of Fig. 1, as seen in the direction indicated by the arrows.

More specifically, A represents a saddle of ordinary construction, which is mounted on a bicycle frame B in the usual manner; the saddle A being attached at its forward end to a double coiled spring C, one end of which is attached to a pair of saddle side bars D, rigidly mounted on a collar E, secured to a post F, carried by the frame B. The opposite end portion of the spring C extends rearwardly beneath the saddle A, and is looped around a bolt G, passing through a bracket H, attached to the rear portion of the saddle A by rivets I, as in ordinary cycle saddle construction.

Pivotally secured to the saddle bars D, by means of pivot pins J, are links K, the outer ends of which are pivoted by pivot pins L to brackets M. The brackets M are secured by means of nuts 4, together with the lower ends of helical springs 5, to bolts N, which depend downwardly from the bracket M, the lower ends of which are threaded to receive nuts O, and by means of which the lower ends of the coiled springs 6 are secured to the bolts N.

The upper ends of the springs 6 are secured to extensions P, formed on the rear ends of the saddle bars D, and the upper ends of the helical springs 5 are secured to the saddle A by means of the bolts G, as particularly shown in Fig. 3.

The foregoing structure constitutes an ordinary, well known type of bicycle saddle.

The present invention resides in a back member 7 and the manner of mounting same on the cycle saddle in such manner that the back 7 will be resiliently carried by the saddle cushioning springs 5 and 6.

In carrying out the present invention a pair of bracket plates 8 are provided, having openings therein adapted to receive the bolts G; the bracket plates 8 being interposed between the springs 5 and the brackets H, as particularly shown in Fig. 3.

The outer ends of the bracket plates 8 are formed with apertures 8', through which the upper ends of tubular members 9 extend; the tubular members 9 having collars or flanges 9' on their upper ends adapted to seat on the bracket plates 8 to limit the downward movement of the tubular members. The lower ends of the tubular members 9 are closed by means of caps 10, which are threaded thereon and adapted to engage the under sides of bracket plates 11, carried on the lower ends of the bolts N; the bracket plates 11 being formed with apertures 12, through which the lower portions of the tubular members 9 slidably extend.

The tubular members 9 are here shown as formed with a plurality of lugs or extensions 13 and 14 projecting rearwardly in relation to the saddle A. The lugs 13 are provided with threaded bores adapted to receive the threaded portions of set-screws 15, and the lugs 14 are open at their outer ends to form sockets, and are formed with lateral threaded bores for the reception of the set-screws 16. The tubular members 9 are open at their upper ends to form sockets to receive a pair of cylindrical back bars 17, the upper ends of which are connected with a back-rest 18; the upper end portions of the back bars 17 being flattened at 19 and perforated to receive screws, which pass through the bars 17 and engage a transversely-extending panel 20, upon which a padded cushion 21 is secured.

The height of the cushion 21 in relation to the saddle A may be adjusted by varying the position of the back bars 17 longitudinally in the tubular members 9; the set screws 15 being adapted to engage the back rest 17 to hold the latter against movement in their desired adjusted position. The back bars 17 may be removed from the tubular members 9 and inserted in the outer ends of the lugs 14 and secured to the latter by means of the set-screws 16, with the cushion 21 extending uppermost, thereby forming a seat rearward of the saddle A.

In the operation of the invention, downward pressure on the back member, either when employed as such or as a seat, will cause a corresponding downward movement of the tubular members 9; this movement being cushioned by the combined action of the springs 5 and 6, which support the bracket plates 8, from which the tubular members 9 depend. Any rocking movement of the tubular members 9 with the bracket plates 8 as the pivotal support, will be cushioned by the action of the spring 6; any oscillation or longitudinal movement of the tubular members 9 will be resisted by the coil and recoil of the spring 6. The apertures 8' and 12 in the bracket plates 8 and 11 respectively are of such size in relation to the tubular members 9 as to form a clearance, and thereby permit a limited oscillating and longitudinal movement of the tubular members in relation to the bracket plates.

What I claim is:

1. A back for cycle saddles comprising the combination of a saddle having saddle bars, coiled springs connected to the rear ends of said saddle bars, bolts secured to said coiled springs, brackets secured to the upper ends of said bolts, links connecting said brackets to the saddle bars, springs connecting said brackets to the rear portion of the saddle, a pair of bracket plates supported on said last-named springs, a pair of bracket plates secured to the bolts and arranged below the first-named springs, tubular members carried by said bracket plates, and a back rest demountably carried by said tubular members.

2. A back rest for cycle saddles comprising the combination of a pair of saddle bars, a saddle carried thereby, coiled springs mounted on the rear ends of the saddle bars, upwardly extending bolts secured to the lower portion of said springs, brackets secured to the upper ends of said bolts, links connecting said brackets to the saddle bars, springs connecting said brackets to the rear portion of the saddle, bracket plates interposed between said last-named springs and the saddle having apertures therein, dependent tubular members projecting through the apertures in said plates and having a limited downward movement in relation thereto, bracket plates mounted on the lower ends of the bolts having apertures therein through which the lower portions of the tubular members extend, a pair of rods slidably mounted in said tubular members, and a back rest carried by said rods.

3. A back rest for cycle saddles comprising the combination of a pair of saddle bars, a saddle carried thereby, coiled springs mounted on the rear ends of the saddle bars, upwardly-extending bolts secured to the lower portion of the said springs, brackets secured to the upper ends of said bolts, links connecting said brackets to the saddle bars, springs connecting said brackets to the rear portion of the saddle, bracket plates interposed between said last-named springs and the saddle having apertures therein, dependent tubular members projecting through the aperture in said plates and having a limited downward movement in relation thereto, bracket plates mounted on the lower ends of the bolts having an aperture therein through which the lower portions of the tubular members extend, a pair of rods slidably mounted in said tubular members, a back rest carried by said rods, and means for adjusting the positions of said rods in relation to the tubular members.

In witness that I claim the foregoing I have hereunto subscribed my name this 23rd day of July, 1912.

GRANT FRIEL.

Witnesses:
EDMUND A. STRAUSE,
EARLE R. POLLARD.